US012558819B2

(12) United States Patent
Susnjara et al.

(10) Patent No.: US 12,558,819 B2
(45) Date of Patent: Feb. 24, 2026

(54) METHOD AND SYSTEM FOR CREATING ADDITIVE PARTS

(71) Applicant: Thermwood Corporation, Dale, IN (US)

(72) Inventors: Kenneth J. Susnjara, Birdseye, IN (US); Lawrence S. Epplin, Grandview, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 18/808,198

(22) Filed: Aug. 19, 2024

(65) Prior Publication Data

US 2025/0144849 A1    May 8, 2025

Related U.S. Application Data

(63) Continuation of application No. 18/504,394, filed on Nov. 8, 2023, now Pat. No. 12,097,644.

(51) Int. Cl.
| | |
|---|---|
| *B29C 33/38* | (2006.01) |
| *B29C 64/147* | (2017.01) |
| *B33Y 10/00* | (2015.01) |
| *B33Y 30/00* | (2015.01) |
| *B33Y 50/02* | (2015.01) |

(52) U.S. Cl.
CPC ........ *B29C 33/3842* (2013.01); *B29C 64/147* (2017.08); *B33Y 10/00* (2014.12); *B33Y 30/00* (2014.12); *B33Y 50/02* (2014.12); *B29K 2905/02* (2013.01); *G05B 2219/49366* (2013.01)

(58) Field of Classification Search
CPC .......... G05B 2219/49366; B26D 5/005; B29C 64/147; B23K 26/38
See application file for complete search history.

(56) References Cited

U.S. PATENT DOCUMENTS

| | | | | |
|---|---|---|---|---|
| 4,752,352 A | | 6/1988 | Feygin | |
| 5,015,312 A | * | 5/1991 | Kinzie | ..................... B44C 3/02 156/387 |
| 5,031,483 A | * | 7/1991 | Weaver | ................. B29C 33/302 451/5 |

(Continued)

FOREIGN PATENT DOCUMENTS

| | | |
|---|---|---|
| CN | 215351935 U | 12/2021 |
| GB | 2539381 A | 12/2016 |

OTHER PUBLICATIONS

Fixture Tabs for CNC Machining NPL, Jun. 29, 2022, "https://sendcutsend.com/services/cnc-routing/tabs/", 1 page (Year: 2022).*

*Primary Examiner* — Michael W Hotchkiss
(74) *Attorney, Agent, or Firm* — Bookoff McAndrews, PLLC

(57) ABSTRACT

A method of manufacturing a part with a plurality of cut segments includes receiving a sheet of material with a machining apparatus and removing material during one or more first passes with the machining apparatus to form a plurality of segments in the sheet of material. The method also includes forming a tab by removing material during the one or more first passes with the machining apparatus for forming the segments, the tab connecting two segments within the sheet of material to each other and removing material with the machining apparatus to form joints on the segments.

18 Claims, 8 Drawing Sheets

40

42 RECEIVE SHEET OF MATERIAL

44 REMOVE MATERIAL TO FORM SEGMENTS IN SHEET OF MATERIAL

46 FORM TABS CONNECTING SEGMENTS

48 REMOVE MATERIAL TO FORM JOINTS

50 REMOVE TABS

52 PRINT INDICIA

(56)  References Cited

U.S. PATENT DOCUMENTS

| | | | | |
|---|---|---|---|---|
| 6,128,546 | A * | 10/2000 | Basista | G05B 19/4205 |
| | | | | 700/173 |
| 7,352,101 | B2 | 4/2008 | Fujita | |
| 7,469,620 | B2 | 12/2008 | Fagan | |
| 8,428,767 | B2 * | 4/2013 | Tremoureux | B26D 5/00 |
| | | | | 700/32 |
| 9,550,349 | B1 | 1/2017 | Larsen et al. | |
| 9,566,677 | B2 * | 2/2017 | Wu | B23K 26/083 |
| 10,293,589 | B2 | 5/2019 | Larsen et al. | |
| 11,203,062 | B2 | 12/2021 | Meacham | |
| 11,345,081 | B1 * | 5/2022 | Susnjara | B29C 64/30 |
| 11,370,166 | B2 | 6/2022 | Swartz et al. | |
| 2005/0172764 | A1 * | 8/2005 | Fagan | B23K 37/0235 |
| | | | | 83/13 |
| 2007/0193847 | A1 * | 8/2007 | Keating | F16D 13/648 |
| | | | | 192/113.34 |
| 2009/0223334 | A1 | 9/2009 | Buettner | |
| 2010/0327690 | A1 | 12/2010 | Umeda et al. | |
| 2011/0265617 | A1 | 11/2011 | Christian | |
| 2013/0000455 | A1 * | 1/2013 | Kaiser | H02K 15/02 |
| | | | | 83/40 |
| 2013/0225345 | A1 | 8/2013 | Bodensteiner et al. | |
| 2013/0293060 | A1 | 11/2013 | Hasuo et al. | |
| 2014/0060271 | A1 * | 3/2014 | Norberg Ohlsson | B24C 1/045 |
| | | | | 83/13 |
| 2015/0027999 | A1 * | 1/2015 | Yamaguchi | B23P 23/04 |
| | | | | 219/121.44 |
| 2016/0318088 | A1 * | 11/2016 | Klinkhammer | B21D 28/16 |
| 2016/0318202 | A1 * | 11/2016 | Wilhelm | B23K 26/38 |
| 2017/0248176 | A1 * | 8/2017 | Keating | B32B 37/12 |
| 2019/0143587 | A1 | 5/2019 | Mamrak et al. | |
| 2020/0151286 | A1 * | 5/2020 | Willis | G06F 30/00 |
| 2020/0368813 | A1 * | 11/2020 | Mackie | B22F 12/50 |
| 2021/0078110 | A1 * | 3/2021 | Mienhardt | B26F 1/38 |
| 2021/0146423 | A1 | 5/2021 | Zalduegui | |
| 2022/0362988 | A1 * | 11/2022 | Pelaingre | B33Y 40/20 |
| 2023/0078348 | A1 | 3/2023 | Kozuka et al. | |
| 2024/0207976 | A1 * | 6/2024 | Krause | B23K 26/38 |
| 2024/0326172 | A1 * | 10/2024 | Mach | B23K 26/359 |

* cited by examiner

METHOD AND SYSTEM FOR CREATING ADDITIVE PARTS

CROSS-REFERENCE TO RELATED APPLICATIONS

This patent application is a continuation of and claims the benefit of priority to U.S. application Ser. No. 18/504,394, filed on Nov. 8, 2023, the entirety of which is incorporated herein by reference.

TECHNICAL FIELD

Aspects of the present disclosure relate to systems and methods for fabricating components. In some instances, aspects of the present disclosure relate to systems and methods for fabricating components (such as, e.g., patterns, molds, and similar products, etc.) via techniques or processes that have similarities with 3D printing processes involving layering. These techniques or processes may enable, in at least some embodiments, production of lower-cost molds or tooling without the use of a 3D printer.

BACKGROUND

Additive manufacturing techniques and processes generally involve the buildup of one or more materials to make a net or near net shape (NNS) object, in contrast to subtractive manufacturing methods. Although "additive manufacturing" is an industry standard term (ASTM F2792), additive manufacturing encompasses various manufacturing and prototyping techniques known under a variety of names, including freeform fabrication, 3D printing, rapid prototyping/tooling, etc.

Some additive manufacturing techniques use large-scale 3D printers that are capable of fabricating very large parts, molds, patterns, etc. These parts can be produced from fiber-reinforced thermoplastic materials, for example. One method of producing these parts utilizes a polymer extruder which generates a bead of molten thermoplastic material, beads of this material being added in sequence to that the part is produced one layer at a time. These layers can be modified and/or flattened into wider beads during this additive process using devices such as tamping plates, rollers, or the like. Using these approaches, sometimes referred to as 3D printing, the part is made slightly larger than desired. After the part cools and hardens, it is machined to the final size and shape. The resulting part is generally a shell of a specific thickness and of the approximate size and shape desired.

Another type of additive manufacturing can be referred to as "cut layer" additive manufacturing. In some examples of cut layer additive manufacturing, pieces can be cut from porous material, stacked on top of one another, and attached together to create a part. In some cases, this part may be hollow, comprised of individual parts that are narrow beads that, when stacked together, create a shell or wall around the outside shape of the desired part. In some approaches, a shell or wall is built from a porous material and infused with a catalyzed thermoset liquid. The liquid cures to produce a rigid composite part reinforced with the porous material.

There are times, however, when it is desirable to produce a part from non-porous material such as metal (e.g., aluminum). Examples of potential applications for such a part include industrial molds and tooling such as thermoforming molds, compression molds, and injection molds. In general, aluminum molds for applications such as compression or injection molds are not suitable for long-term production but can be desirable for prototyping and short run sample production, provided that the aluminum molds have a suitable cost and can be produced in an appropriate period of time.

One reason aluminum or other materials having desirable properties are not used for at least some applications, such as molds and tooling, is that these relatively large parts involve use of large blocks of material and significant time to remove (e.g., machine away) excess material to produce the desired shape, such as the cavity of a mold. This is especially true of large, deep parts where half the material, or more, may be removed to achieve the desired geometry for the final part.

Some parts, including tooling, might also benefit from structures including internal channels through which heated or cooled liquid can be circulated to control the temperature of the tool during operation. However, machining these channels in a solid block of material requires significant time and specialized equipment, further increasing build time and cost. Also, in some cases, it might not be possible to locate these channels in certain areas of the mold by machining into a solid block from the outside. This might make it impractical, or even impossible, to create channels in some locations of parts made via traditional additive manufacturing techniques.

In some examples of cut layer additive manufacturing, pieces can be cut from porous material, stacked on top of one another, and attached together to create a part. In cut layer additive manufacturing, sheets of material can be used, these sheets generally having a lower cost per a pound than a large block of the same material. Cut layer manufacturing may be beneficial by involving machined of less material to produce a final product as compared to other types of additive manufacturing. Also, cut layer manufacturing can provide the ability to form heating and/or cooling channels into cut sheets that could not be easily machined in a solid block of material.

Cut layer additive layer segments can be long, relatively narrow, and during preparation of the segments, initially nested together on sheets of material. Parts made in cut layer additive manufacturing can be cut from the sheets of material using a high-speed machining or routing process where a rotating cutting tool is used to cut the segments from the sheet. These cutting tools can have a length that is longer than the thickness of the sheet from which the segments are cut.

Suitable parts can be made from a variety of materials, including porous material to which a thermoset resin will be later added, or non-ferrous metal, such as aluminum, or other non-porous materials. Some methods of processing these materials include securing sheets of material to a table top of a machine for cutting the nested segments. Once cut, a vacuum can be created under a surface with openings (which may be the table top of the cutting machine), to generate a downward force on sheet material placed on the table top. While this approach can be suitable for some non-porous parts that are relatively large, the size of the part allowing the vacuum to create suitable downward force (e.g., sufficient force to withstand cutting forces generated during the cutting process), this approach might not be suitable for use with at least some cut layer parts.

Challenges can arise, for example, when the part formed by cut layer additive manufacturing is relatively small or relatively porous. Materials used in this process, which allow flow of air due to porosity and/or removal of material, might be unable to generate adequate downward holding force with the vacuum applied with the machine. Additionally, these materials might be unsuitable for use with a vacuum-generating machining apparatus when the cutting forces are relatively high, which can be true when machining aluminum or other materials, the cutting forces being too large to be offset by vacuum hold-down force.

Another potential problem for cut layer parts is the inability to identify the individual layers and layer segments for proper assembly. To address this, a label can be used, the label being affixed to the surface of the part. However, unless the label is removed prior to assembly, which necessitates additional assembly effort, it can unacceptably cause separation of the individual layers. For example, the label can cause layer separation by a distance equal to the thickness of the label.

One additional potential problem for cut layer additive parts is producing layer segments with sufficiently-tight joints, these joints being created with the purpose of connecting connect the segments together. This problem can be introduced to flexing of a tool bit, for example.

SUMMARY

Aspects of the present disclosure relate to, among other things, methods and apparatus for fabricating components via layering techniques. Each of the aspects disclosed herein may include one or more of the features described in connection with any of the other disclosed aspects. At least some aspects of this disclosure are directed to processes of producing cut layer additive parts with features such as tabs, final cuts, and the ability to label porous and non-ferrous metal similar to and including, aluminum.

Exemplary manufacturing process during which cut layer parts are held together may include removing material while leaving tabs in place, the tabs connecting each part (e.g., a portion or a segment for assembly in a larger part) to adjacent parts (e.g., adjacent portions or segments). This process may include preventing, at least initially, the parts from being cut entirely free from each other. For example, a portion of one part may connect to another part. During cutting, these portions, e.g., tabs, may be used to hold the part in position during machining. In some aspects, these tabs may be used instead of using vacuum to hold the part.

One or more aspects may include a process for producing an accurately-shaped puzzle joint. An exemplary machine-implemented process may be performed in two steps or stages. The initial cutting process may cut a joint slightly larger than for the desired final dimensions, for example about 0.005 inch (about 0.13 mm) larger than the desired final size. Once the joint has been completely machined in this slightly-oversized form, a second pass of a cutting tool may be used to remove the remaining material (e.g., the remaining approximately 0.005 inch or approximately 0.13 mm).

Another potential challenge involved in cut layer manufacturing, and in particular, when using a non-ferrous metal such as aluminum, is labelling the layers or segments. Embodiments of the present application may address this challenge. For example, a step in a process (or a subsequent process) for producing cut layer additive parts may include identifying the layers and/or layer segments in a manner that is compatible with non-ferrous metals, including aluminum. In some aspects, an unlabeled sheet may be cut until all cutting is completed, with the exception of the removal of tabs connecting the individual parts. At this point, the surface of segments may be cleaned and dried such that all cutting fluid (when cutting fluid was used in subsequent steps) is removed. Then, desired information may be printed on individual segments of the part and tabs removed without the use of any cutting fluid.

In one aspect, a method of manufacturing a part with a plurality of cut segments may include receiving a sheet of material with a machining apparatus and removing material during one or more first passes with the machining apparatus to form a plurality of segments in the sheet of material. The method may also include forming a tab by removing material during the one or more first passes with the machining apparatus for forming the segments, the tab connecting two segments within the sheet of material to each other and removing material with the machining apparatus to form joints on the segments.

In another aspect, a method of manufacturing a part includes receiving a sheet of material with a machining apparatus, removing material from the sheet with the machining apparatus to form a plurality of segments, and removing material with the machining apparatus from ends of the plurality of segments. The method may further include forming joints in ends of the plurality of segments during one or more first passes of the machining apparatus and removing additional material from the ends of the segments during one or more second passes with the machining apparatus.

In yet another aspect, a system for manufacturing a part with a plurality of segments may include a machining apparatus configured to receive a sheet of material and a controller configured to generate commands to control the machining apparatus. The controller may be programmed to: cause the machining apparatus to remove material during one or more first passes with the machining apparatus to form a plurality of segments in the sheet of material, cause the machining apparatus to form a tab by removing material during the one or more first passes for forming the segments, the tab connecting two segments within the sheet of material to each other, and cause the machining apparatus to remove material to form joints on the segments.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and systems for fabricating components via layering techniques. Specifically, the methods and systems described herein may include, or be configured to perform, processes of producing cut layer additive parts using, for example, tabs, final cuts, and the ability to label porous and non-ferrous metals (e.g., aluminum or similar metals).

While some processes include use of a solid block of material for forming a mold, rather than of machining a mold from a solid block of material, a mold blank may be assembled by stacking layers, such as layers formed a plurality of layer segments. These layers may be cut from sheets of the material, including a porous material such as fiberboard (e.g., medium-density fiberboard; "MDF") or a non-porous material such as aluminum. A layered mold blank may be produced by these segments, the blank having a size and shape that approximately matches those desired for the final mold. This slightly-oversized layered mold blank may then be machined to the desired final size and shape. This process may result in a part that is similar in structure to additive manufactured parts manufactured by other methods (i.e., parts built by printing a series layers).

Figure 1:
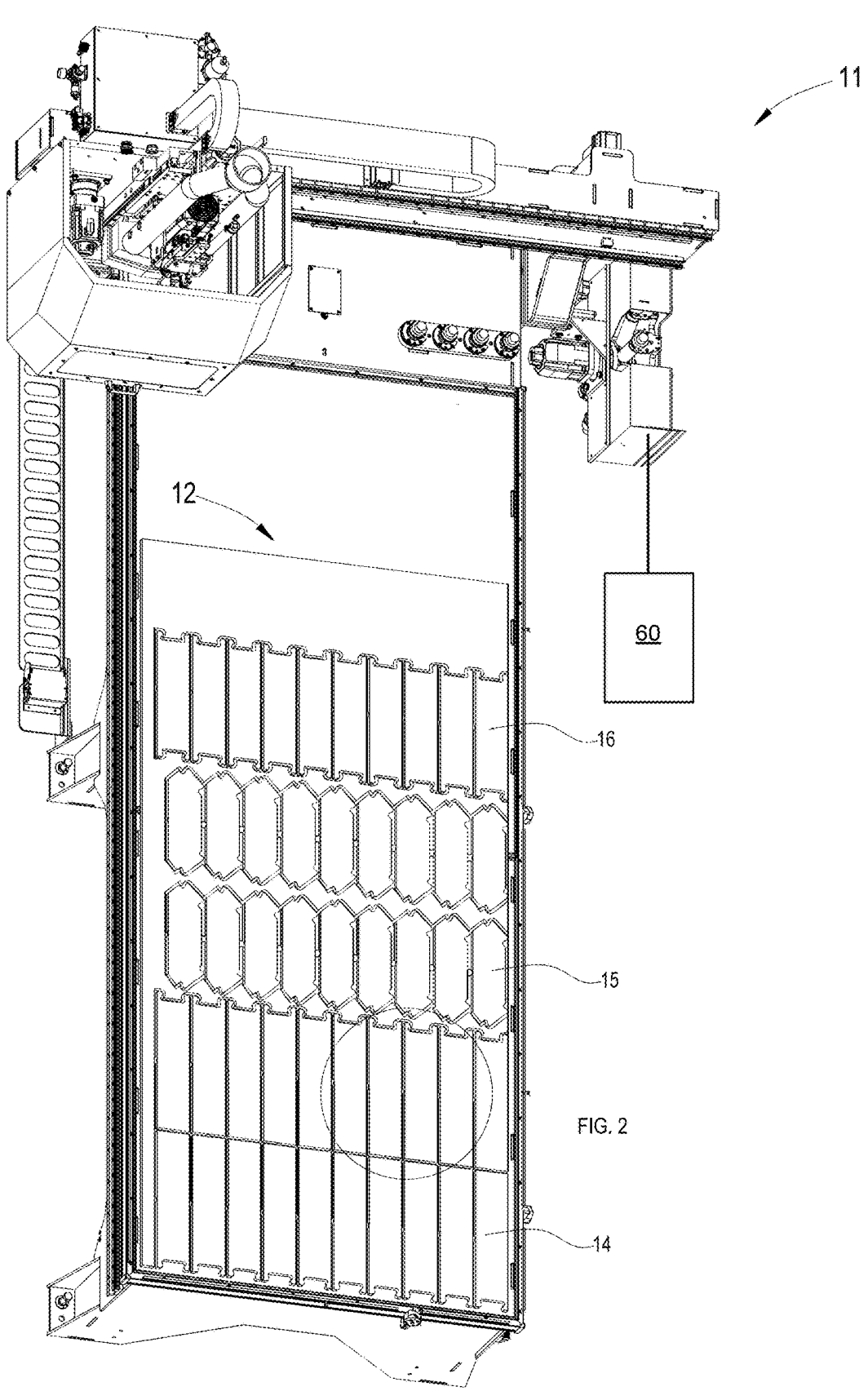
FIG. 1 is a perspective view of an exemplary cutting machine (e.g., a CNC machine) operable to remove material and form layers from a sheet of material, according to aspects of the present disclosure.

In contrast to traditional additive manufacturing methods, layers in at least some embodiments are cut from sheets 12 of material using a cutting machine 11, also referred to herein as a "machining apparatus," such as a CNC router, as shown in FIG. 1. A controller 60 may be incorporated in machine 11 and/or may be part of a system for manufacturing a part, as described herein. Controller 60 may be configured to generate comments to cause machine 11 to remove material from a sheet 12, as described herein.

The layers may be assembled, as opposed to layers that are applied to each other by a printing machine during a printing process. These individual layers may include a plurality of individual segments, such as segments 14, 15, and 16 shown in FIG. 1. Segments 14, 15, and 16 (and/or other segments) may be fastened to each other using one or more suitable structures. Segments 14, 15, and 16 may be removed from sheet 12 of material as described below.

A method 40 (FIG. 8) for manufacturing a part with a plurality of cut segments may include creating of tabs connecting individual segments, creating of joints in the segments, and if desired, printing indicia on the segments. Exemplary segments 14, 15, and 16 are shown in FIG. 1.

Figure 8:
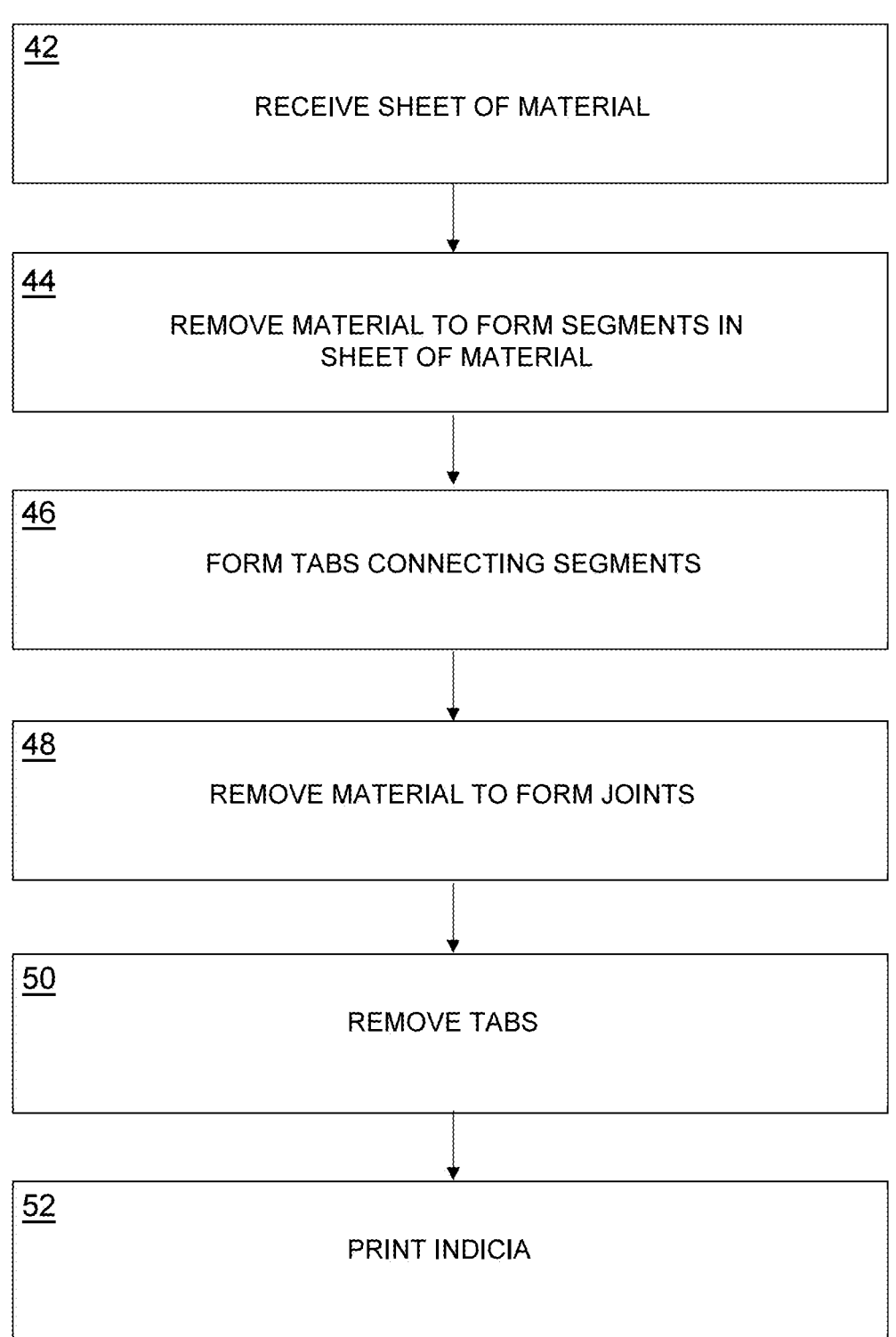
FIG. 8 is a flowchart for an exemplary method of manufacturing a part with a plurality of cut segments, according to aspects of the disclosure.

FIG. 8 is a flowchart illustrating exemplary steps of method 40 and is described below with reference to FIGS. 1-7B. Method 40 may include receiving one or more sheets of material in a step 42, removing material to form segments in the sheet of material in a step 44, and removing material to form tabs connecting the segments in a step 46. Method 40 may further include removing material from the segments to form joints at ends of the segments in a step 48, and removing the tabs connecting the segments in a step 50. A step 52 of printing indicia may be performed to facilitate segment identification and assembly of a part.

While steps 42-52 of method 40 are illustrated in a particular order and described as part of a single method, as understood, one or more of steps 42-52 may be performed in a different order, during overlapping periods of time, simultaneously, etc. Further, while method 40 may include all of steps 42-52, some steps of method 40 are optional. For example, method 40 may include performing only steps 42, 44, 46, and 50, performing only steps 42, 44, and 48, or performing only steps 42, 44, and 52.

Step 42 of method 40 may include receiving one or more sheets 12 of material with machining apparatus 11, as shown in FIG. 1. Method 40 may include forming a part from a single sheet 12, or multiple sheets 12. Each sheet 12 may be received on a surface of machine 11 such that a planar surface of sheet 12 faces a cutting tool of machine 11 during machining.

Figure 2:
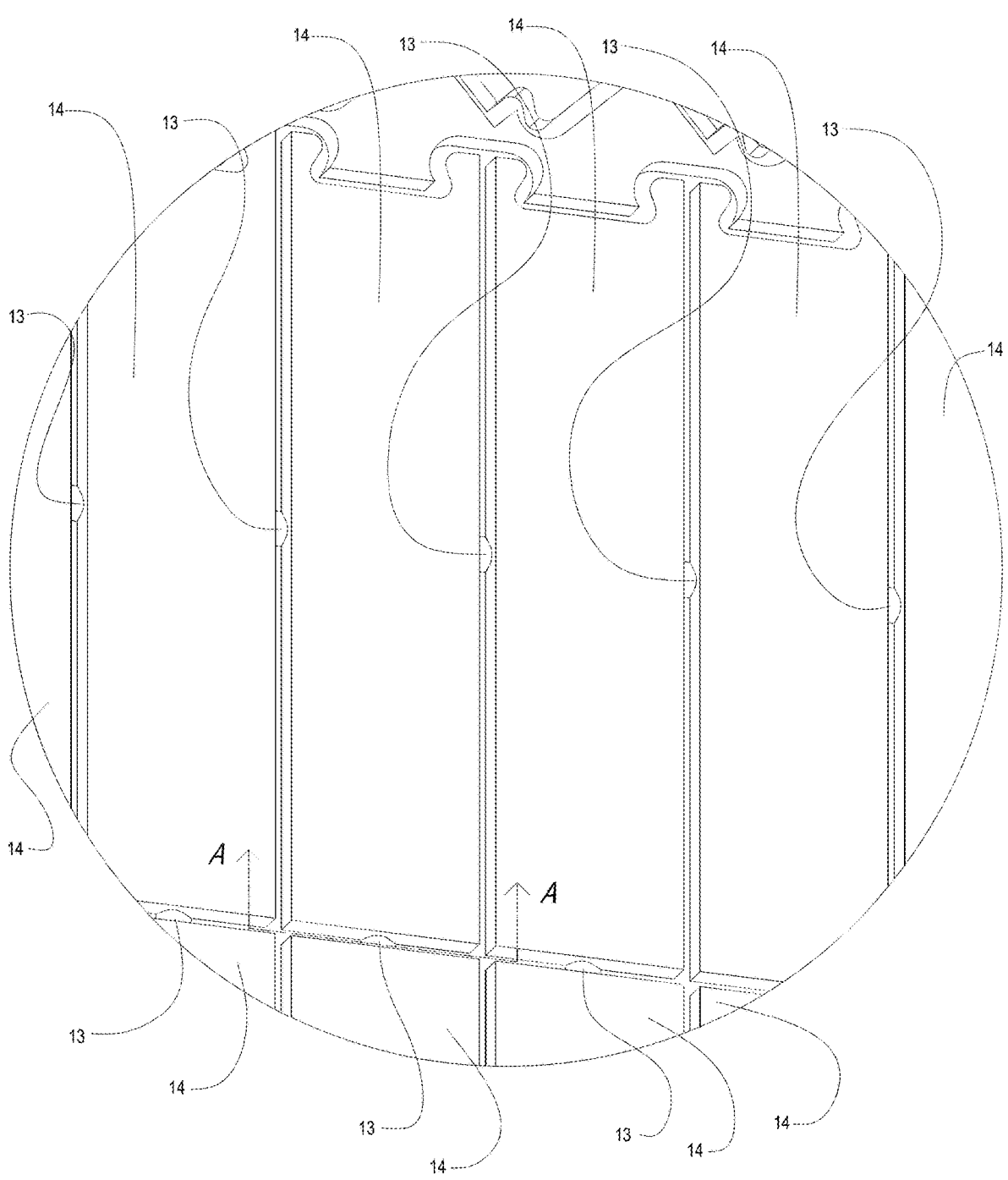
FIG. 2 is an enlarged view of exemplary layer segments within the encircled portion of FIG. 1, these segments being cut from a sheet of material and in a state with only tabs holding individual layer segments in place.

In some aspects, layer segments 14, 15, and 16 may be formed in step 44 (FIG. 8) without completely separating segments 14, 15, and 16 from each other. For example, cut layer segments may be held together by not fully cutting layer segments free from the sheet 12 of material when these segments are initially formed. Instead, during step 46 and as shown in FIG. 2, tabs 13 may connect each segment to adjacent segments. Thus, tabs 13 may be used to hold the layer segments 14, 15, and 16 in position for cutting.

Tabs 13 may be formed on lateral side surfaces of segment 14, 15, and 16. For example, as shown in FIG. 2, tabs 13 may be formed on lateral sides that do not include a joint. Additionally or alternatively, tabs 13 may be formed at one or both longitudinal ends of segment 14, 15, and 16, a tab 13 at one longitudinal end being shown in FIG. 2. Tabs 13 may be formed on a side of segment 14, 15, and 16 that is opposite with respect to a joint formed in the same segment. Any number of tabs 13 may be formed. In some aspects, tabs 13 connect a plurality of segments together, as shown in FIG. 2. The number of segments interconnected by tabs 13 may include at least three segments, at least four segments, at least five segments, at least ten segments, at least twenty segments, or more.

Tabs 13 may be fabricated by raising the cutting tool of machine 11 at the location of tab 13, moving the tool a small distance and then lowering the tool after it has passed this distance. This may form a relatively thin, vertically-extending tab 13. Tab 13 may extend in a manner that securing and directly connects a pair of individual segments 14, 15, and 16 to each other. Tabs 13 formed in this manner may have an approximately rectangular-shaped or approximately square-shaped cross section.

Figure 3:
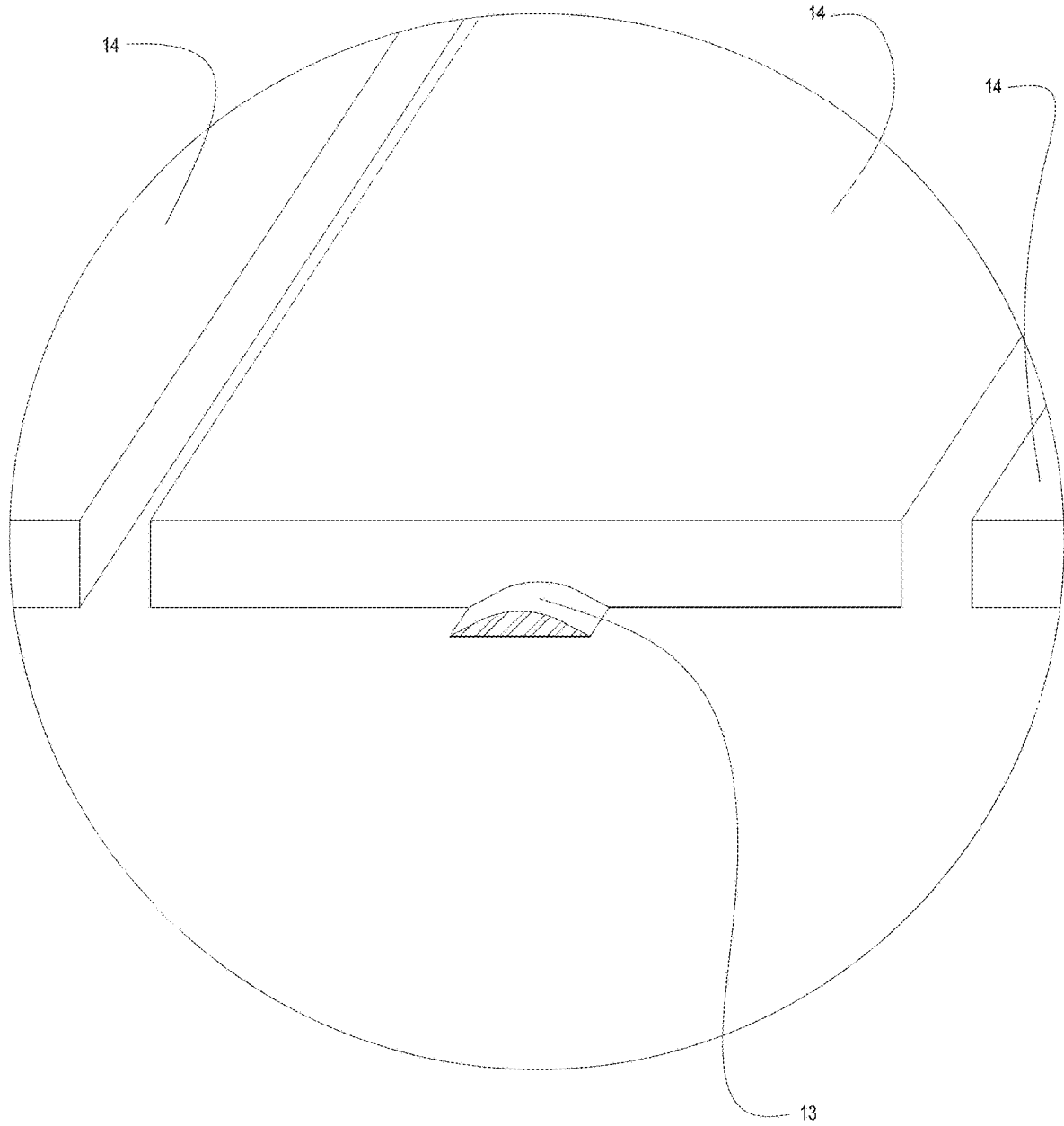
FIG. 3 is an enlarged cross section A-A view of an exemplary tab on a layer segment.

If desired, one or more tabs 13 may be fabricated in step 48 by raising the tool at a slight angle toward the direction of movement, and then lowering the tool again at the opposite angle, creating an angled tab 13. For example, an angled tab 13 may have an arc or other curved surface that extends along a portion or entirety of its cross-section, as seen in FIG. 3, which is a cross-sectional view along line A-A in FIG. 2.

Machine 11 may continue the cutting process while shaping each tab 13. This may include operating apparatus 11 without stopping rotation of a tool of machine 11 when forming a plurality of tabs 13 (e.g., all of the tabs 13 for a particular sheet 12 of material). For example, tabs 13 may be formed while removing material in one or more first passes to form segments 14, 15, and 16 in step 44 (FIG. 8). This may reduce the amount of time required to perform the cutting process. While tabs 13 having square shapes, rectangular shapes, curved or otherwise angled shapes, and arced cross-sectional shapes are described above, tabs 13 can be in any shape or cross-sectional shape that is configured to hold segments 14, 15, and 16 in place.

When desired, e.g., when all segments in a particular sheet 12 of material have been formed by removing material from this sheet 12, tabs 13 can be removed in a step 50 by lowering a cutting tool of machine 11 onto each tab 13 while cutting tool is rotating to remove the tab 13. In some embodiments, the cutting tool used to remove each tab 13 may have a diameter that is slightly smaller than the width of each tab 13.

The removal of tabs 13 in step 50 may involve relatively small cutting force. This may be advantageous by reducing the risk that sheet 12 or the segment 15 being removed from sheet 12 will move during the process of removing each tab 13. While each tab 13 on a segment (e.g., segment 15) is machined away, the remaining tabs 13 may advantageously hold segment 15 in place until the last tab 13 connected to segment 15 is removed and segment 15 is cut entirely free of the immediately-adjacent (i.e., contacting) segments.

Advantageously, the tool of machine 11 that performs the process of removing tabs 13 to free each segment 14, 15, 16 is smaller than the distance between each pair of immediately-adjacent segments 14, 15, 16. Thus, the cutting tool of machine 11 may only contact a particular tab 13 that is currently being removed, while the cutting tool of machine 11 does not contact any of segments 14, 15, and 16. This may minimize the cutting force placed on the two segments 14, 15, 16 connected to the tab 13 which is being removed.

After the process of removing each tab 13 in step 50, segments 14, 15, and 16 will generally have small protrusions at the point where each tab 13 was previously connected to a pair of segments 14, 15, and 16. These can be removed using a secondary cutting operation (e.g., during one or more second passes by machine 11). Alternatively, the remaining small protrusion(s) may remain in place as the outside surface of a cut layer structure may be machined to a final size and shape later in the manufacturing process (e.g., after segments and layers are attached to each other). Thus, machining performed after assembly of segments 14, 15, and 16 and of layers including these segments may include removing the protrusions formed remaining portions of tabs 13.

Figure 4:
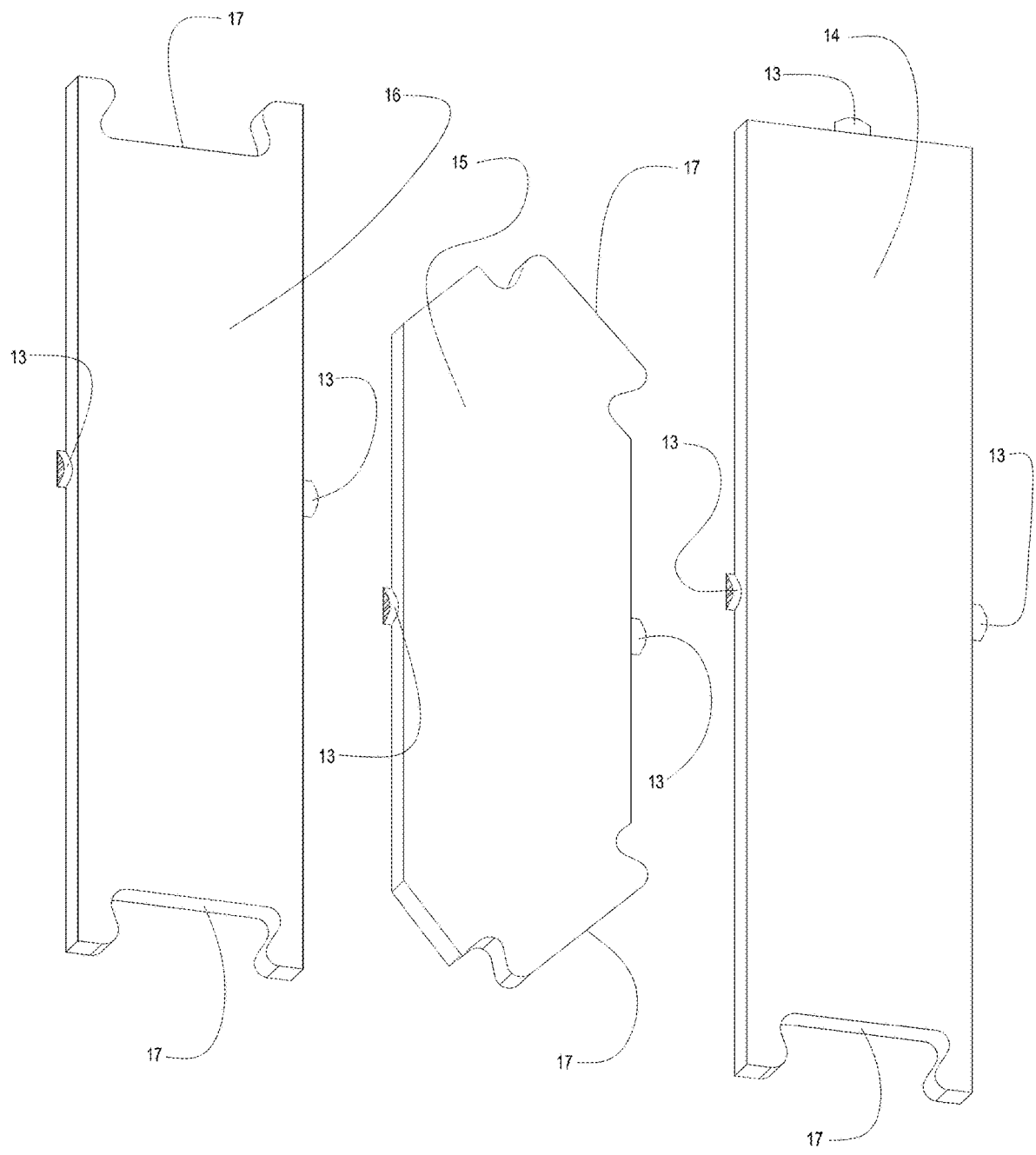
FIG. 4 is a perspective view of exemplary layers segments including puzzle joints.

Processes of producing cut layer additive parts may include the formation of a puzzle joint having accurate dimensions. This may be performed according to step 48 of method 40. Exemplary puzzle joints are shown in FIG. 4, these joints being formed on segments having four sides: a top side, a bottom side, and a pair of lateral sides. Joints 17 are formed on top and bottom sides in the segments shown in FIG. 4, while tabs 13 for connecting these segments on a sheet of material are formed on the two lateral sides, the two lateral sides being free of a joint 17.

During step 48, at least some segments 14, 15, and 16 may be machine to include a joint 17, also referred to herein as a "puzzle joint." Joint 17 may be useful to connect segments 14, 15, and 16 together when assembling segments 14, 15, and 16 into a part. In some configurations, joint 17 may have an appearance similar to tab and socket joints used to hold parts of a jig-saw puzzle together, as shown in FIG. 4. As shown in FIG. 4, some joints may be formed in a manner that is aligned with a length of the segment (see segments 14 and 16), while other joints may extend at an angle with respect to the length of the segment (see segment 15).

Figure 5:
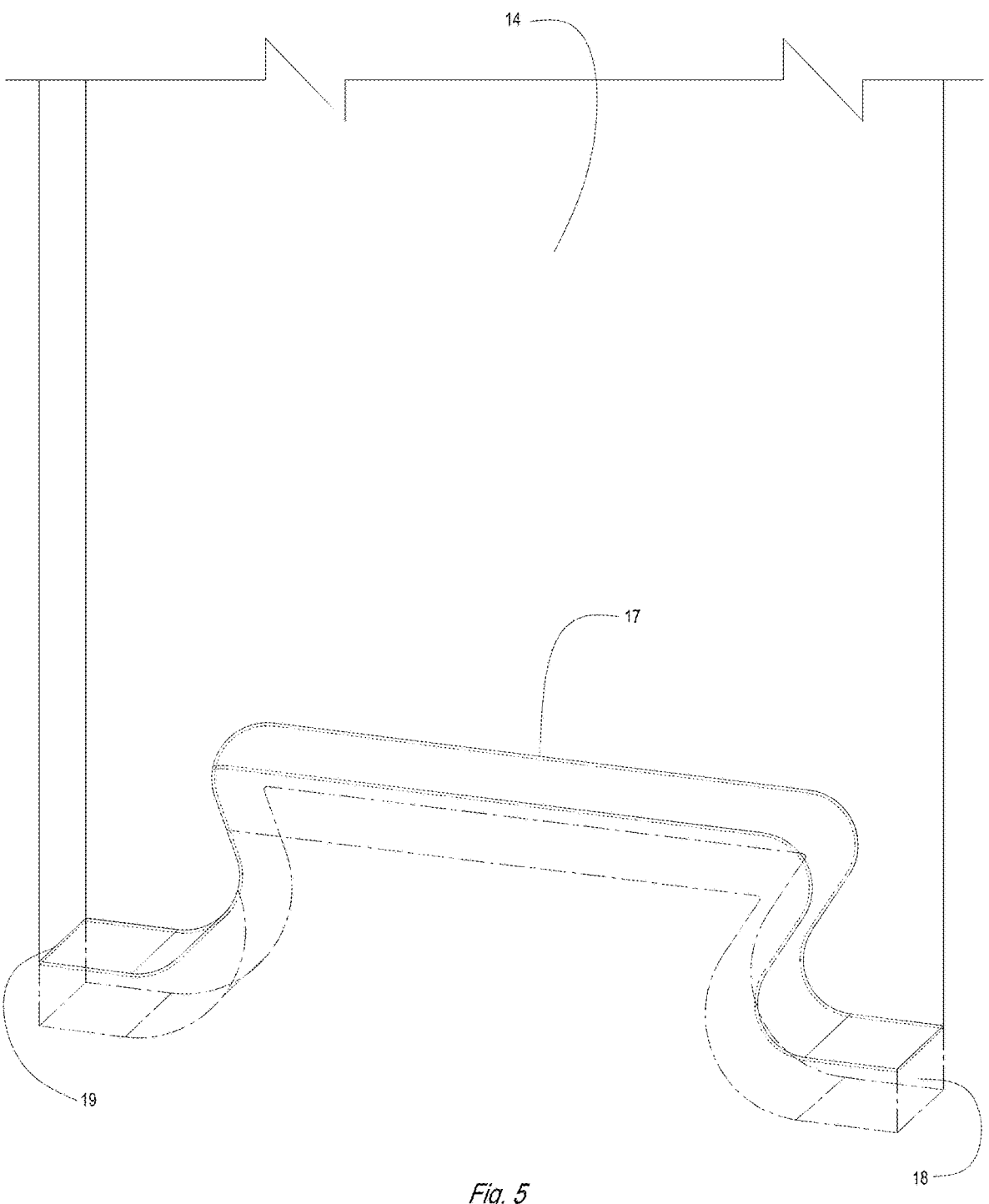
FIG. 5 is an enlarged perspective view of an exemplary layer segment with phantom lines showing dimensions of the segment after a first amount of material was routed away and solid lines showing dimensions of the segment after a second (e.g., final) amount of material was routed away.

Joints 17 may be formed with machine 11 in two stages of material removal during step 48, these stages being represented in FIG. 5. As a first stage of step 48, material may be removed from a segment (segment 14 being shown in FIG. 5), in a first or initial cutting process, such as during one or more first passes. This first cutting may result in an end 18, represented by chain-dot lines in FIG. 5. The size of end 18 formed with the one or more first passes of the first cutting may be result in a joint that is slightly larger than the desired final dimensions. For example, end 18 may have a size that is about 0.005 inch (about 0.13 mm) larger than the final size represented by joint 17 in FIG. 5.

Once oversized joint at end 18 has been completely machined, one or more second passes may be performed with machine 11 during a second stage of step 48. During this second pass or passes, machine 11 may remove the slightly oversized surface on end 18, resulting in final joint with a trimmed end 19. This second pass of machine 11 may remove a relative small amount of material. Due to this, the removal of material from end 18 to form end 19 of joint 17 may result in generation of a little cutting force, avoiding flex of the cutting tool(s) of machine 11 and improving the accuracy of the machined joint formed at end 19 of joint 17.

In some aspects, a process of producing cut layer additive parts may include one or more steps for identifying layers and layer segments, such as step 50. Step 50 may be advantageous as at least some cut layer parts are formed with hundreds of individual portions (e.g., layer segments), or more. Some, or many, of these segments may have similar appearances, making identification of particular segments challenging. It may therefore be beneficial to provide individual parts, such as one or more of layer segments 14, 15, and 16, with an indicia 24 representing information helpful to identify the layer the segment will be used for.

Indicia 24 formed during step 50 may include physical indicators, such as layer indicator 20, segment indicator 21, and/or part indicator 22. Layer indicator 20 may include information related to the layer (the seventh layer in the example shown in FIG. 6). The layer may be specified with the first layer (layer "1") being the bottom layer, or the layer that is the bottom layer during assembly. Segment indicator 21 may indicate the position of the segment within the layer specified with layer indicator 20. Part indicator 22 may identify the specific segment (e.g., in the form of a code, number, or other identifier specific to a particular segment) or identify the particular part in which the segment will be used to facilitate the production of segments for multiple parts simultaneously or within a single sheet 12 of material.

Figure 6:
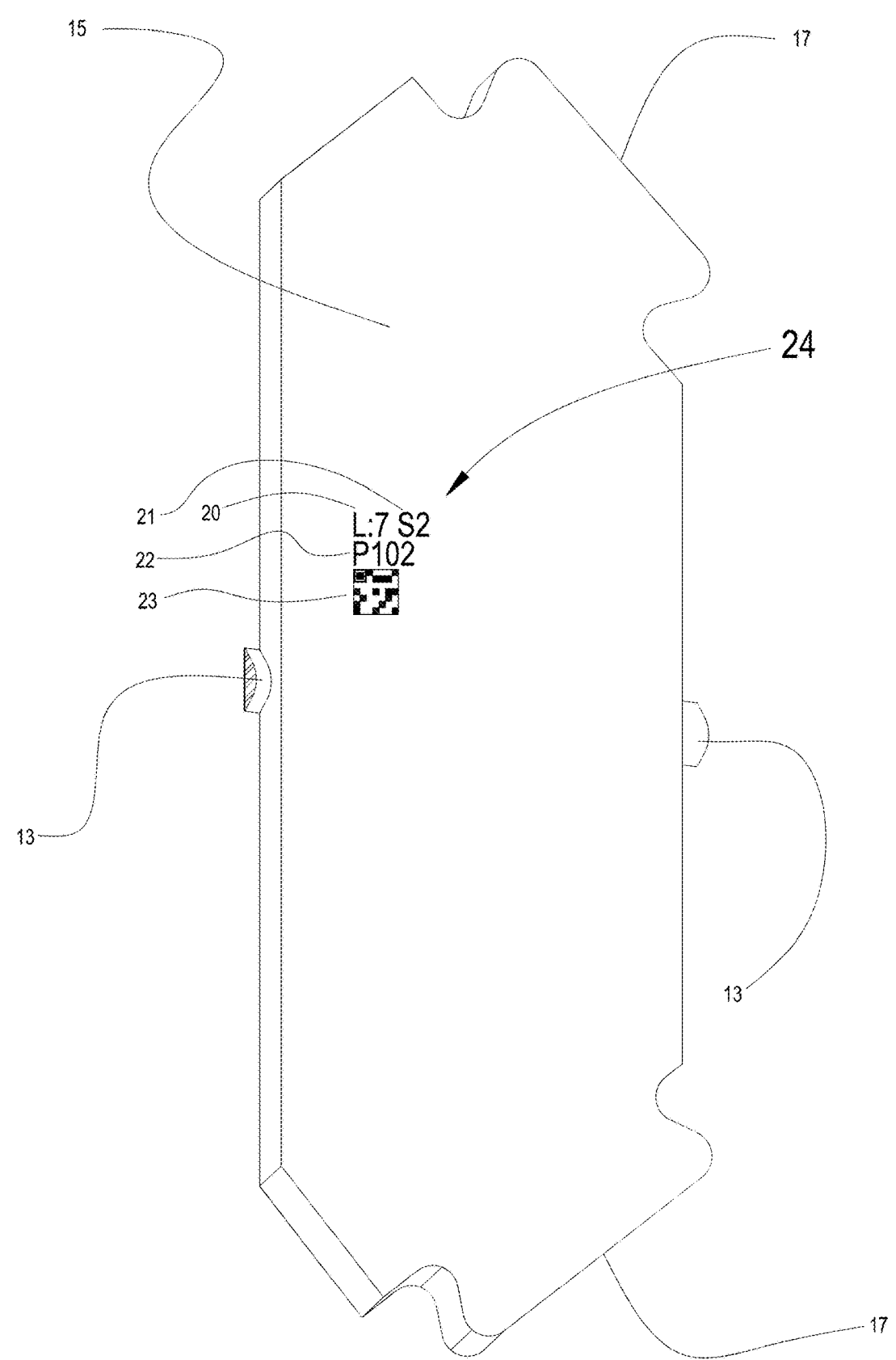
FIG. 6 is enlarged perspective view of an exemplary layer segment with information identifying the layer, layer segment position, and part number being formed in a surface of the segment.
Figure 7:
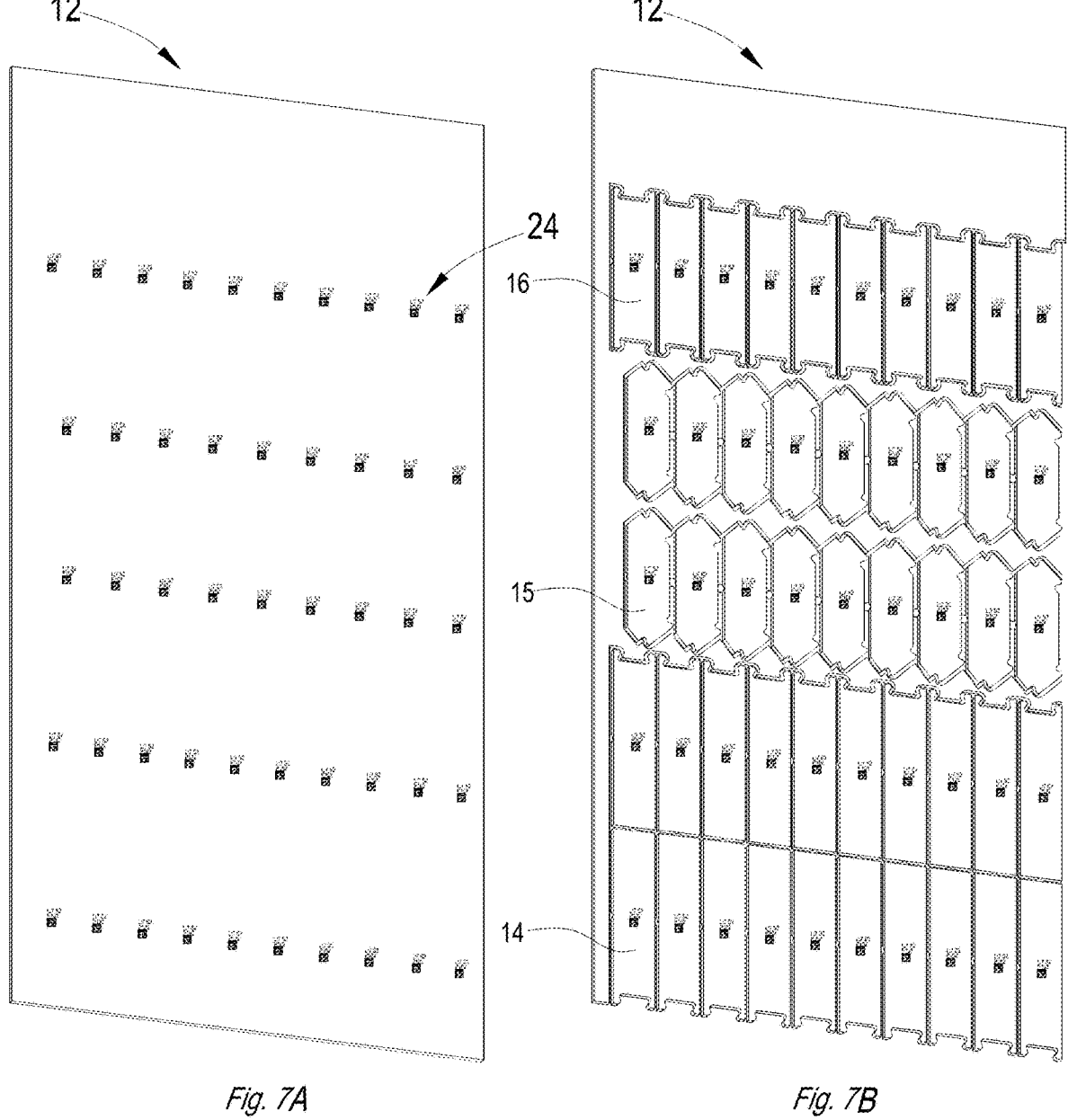
FIG. 7A is a perspective view of an exemplary sheet of material with layer segment identifying information printed on the sheet before routing.
FIG. 7B is a perspective view of an exemplary sheet of material with layer segment identifying information printed on the sheet after routing.

As can be seen in FIG. 6, indicia 20 may include one or more indicators that are readable by a human (e.g., layer indicator 20, segment indicator 21, and/or part indicator 22). These indicators may represent information by using alphanumeric characters such as "L" to represent "layer," "S" to represent "segment," and "P" to represent "part," each in combination with one or more numbers. It may also be useful to provide machine-readable information 23, such as a bar code or QR code (a QR code being shown in FIG. 6) on segment 15. The alphanumeric characters may also be machine-readable, in at least some configurations. Machine-readable information 23 may, when accessed with a computing device, be used to identify a specific segment 15 in the event that segment 15 is to be replaced for any reason. For example, information encoded within machine-readable information 23 may direct apparatus 11 or other system to instructions that, when executed, cause the creation of a duplicate of segment 15.

While exemplary types of information have been described above for inclusion in indicia 24, different and/or additional information may be formed in segment 15 as indicia 24. For example, indicia 24 may present information that represents the location where an alignment dowel can be inserted during assembly, where adhesive should be applied, or other information to facilitate the assembly process.

If desired, a label may be affixed to the surface of the part, this label forming indicia 24. However, in at least some embodiments, indicia 24 is formed directly on the part. For example, indicia 24 may be printed with an appropriate ink or other marking material. Ink or other forms of printing may be compatible with various materials used to form segments 14, 15, and 16 by machining sheets 12 with machine 11.

As shown in FIG. 7A, a sheet 12 of material may receive indicia 24 in step 50 before any segments 14, 15, 16 have been formed. Thus, step 50 may be performed prior to step 44, when desired. Various materials may be compatible with a process of forming indicia 24 before sheet 12 is machined, by printing indicia 24 on the full sheet 12 of material. FIG. 7B shows sheet 12 of FIG. 7A after segments 14, 15, 16 have been formed by machining sheet 12 with machine 11. In some aspects, the location of each segment in sheet 12 may be known in advance, allowing indicia 24 to be placed on sheet 12 before segments 14, 15, 16 are formed as shown in FIG. 7B.

Some techniques for forming indicia 24 may be modified based on the type of material used to form each sheet 12. For example, while printing may be appropriate with some materials, it may be incompatible with others. For example, metal, such as aluminum, may introduce challenges in forming indicia 24, as liquid used to lubricate the cutting tool of machine 11 during the cutting process may contain substances that tend to dissolve ink used to label the part and form indicia 24. This may cause some segments to no longer be properly labeled with indicia 24 when cutting is complete.

In embodiments where it might be beneficial to avoid forming indicia 24 with ink prior to machining, an unlabeled sheet 12 may be cut. All cutting, other than removal of tabs 13 connecting individual segments 14, 15, 16, may be completed prior to formation of indicia 24 in step 50. In some embodiments, step 50 may also be performed prior to a step 52 in which tabs 13 are removed. In these embodiments, once machining of sheet 12 is complete in step 48, the surface of each segment 14, 15, and 16 that was cut from sheet 12 may be cleaned and dried. This process may include removing all cutting fluid that was supplied to the cutting tool of machine 11. Once cutting fluid, when used, is removed, indicia 24 may be printed during step 50 on individual segments 14, 15, 16. Tabs 13 may be removed without the use of cutting fluid or other solvent that would increase the likelihood that the indicia is removed.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. A method of manufacturing a part, the method comprising:
   forming a plurality of segments by removing material from a sheet of material during one or more first passes with a manufacturing apparatus, each segment of the plurality of segments including at least one side having a joint for attaching the segment to another segment, the joints of the plurality of segments being formed in multiple stages including:

the one or more first passes performed with the manufacturing apparatus, during which one or more tabs are formed on at least one side without a joint of each segment of the plurality of segments while the joints are machined to an oversized form having dimensions that are larger than final dimensions; and one or more second passes with the machining apparatus, during which the one or more tabs are removed and the joints are machined while on a surface of the machining apparatus to the final dimensions, wherein the joints are machined to the final dimensions prior to removing the one or more tabs;

assembling the plurality of segments into a plurality of layers; and stacking the plurality of layers to produce the part.

2. The method of claim 1, wherein the joints include tab and socket joints.

3. The method of claim 1, wherein the joints include tab and socket joints and wherein the tab and socket joints are puzzle-shaped joints.

4. The method of claim 1, wherein during the one or more second passes with the machining apparatus, the joints are machined to the final dimensions by reducing widths of the joints by approximately 0.005 inch (approximately 0.13 mm).

5. The method of claim 1, wherein the sheet of material comprises a non-porous material.

6. A method of manufacturing a part, the method comprising:
   forming a plurality of segments by removing material from a sheet of material during one or more first passes with a machining apparatus, each segment of the plurality of segments having a different size, shape, or dimension;
   forming a plurality of removable tabs on the plurality of segments using a tool, at least one removable tab of the plurality of removable tabs including a single curved surface, wherein forming the at least one removable tab includes:
      raising the tool while the tool is positioned at a first angle with respect to a direction of movement of the tool; and
      lowering the tool while the tool is positioned at a second angle with respect to the direction of movement of the tool;
   forming indicia identifying a layer of a plurality of layers on each segment of the plurality of segments;
   assembling the plurality of segments into a plurality of layers; and
   stacking the plurality of layers to produce the part.

7. The method of claim 6, wherein the indicia further identifies a segment of the plurality of segments.

8. The method of claim 6, wherein the indicia includes a layer indicator identifying a layer of the plurality of layers that a segment is to be included in, a segment indicator identifying a position within the layer for the segment, and a part indicator identifying the segment itself.

9. The method of claim 6, wherein the indicia includes a bar code or QR code.

10. A method of manufacturing a part, the method comprising:
   forming a plurality of segments by removing material from a sheet of material during one or more first passes with a machining apparatus, each segment of the plurality of segments including at least one side having a joint for attaching the segment to another segment;

during the one or more first passes with the machining apparatus, forming one or more tabs on at least one side of each segment of the plurality of segments that does not include a joint, the joints being machined to an oversized form having dimensions that are larger than final dimensions, wherein the one or more tabs include a first tab that extends linearly and that couples a first segment of the plurality of segments to a second segment of the plurality of segments to prevent movement of the first and second segments during the one or more first passes with the machining apparatus;

during one or more second passes with the machining apparatus, removing the tabs from the plurality of segments and machining the joints to the final dimensions while the sheet of material is present on a surface of the machining apparatus, wherein the joints are machined to the final dimensions prior to removing the one or more tabs;

assembling the plurality of segments into a plurality of layers; and stacking the plurality of layers to produce the part.

11. The method of claim 10, wherein the first segment and the second segment have different sizes or different shapes.

12. The method of claim 10, wherein each segment of the plurality of segments has a different size or shape.

13. The method of claim 10, wherein each tab of the one or more tabs includes a curved surface.

14. The method of claim 10, wherein each segment of the plurality of segments includes at least two sides and wherein each side of the at least two sides includes a tab of the one or more tabs.

15. The method of claim 10, wherein:

each segment of the plurality of segments includes at least two sides;

each side of the at least two sides includes a tab of the one or more tabs; and each tab of the one or more tabs connects only two segments of the plurality of segments.

16. The method of claim 10, wherein the sheet of material comprises a porous material.

17. The method of claim 10, wherein the sheet of material comprises a non-porous material.

18. The method of claim 10, wherein the part is a mold or a mold blank.

\* \* \* \* \*